United States Patent [19]

Twombly

[11] Patent Number: 4,945,753
[45] Date of Patent: Aug. 7, 1990

[54] APPARATUS AND PROCESS FOR AUTOMATICALLY CALIBRATING LOCOMOTIVE SPEEDOMETERS AS WHEEL SIZE VARIES

[75] Inventor: Jeffrey G. Twombly, Rochester, N.Y.

[73] Assignee: General Signal Corporation, High Ridge Park, Conn.

[21] Appl. No.: 448,778

[22] Filed: Dec. 11, 1989

[51] Int. Cl.⁵ ............................................. G01P 21/02
[52] U.S. Cl. .......................................................... 73/2
[58] Field of Search ............... 364/565; 73/2; 324/163, 324/164

[56] References Cited

U.S. PATENT DOCUMENTS

| | | | |
|---|---|---|---|
| 2,887,654 | 5/1959 | Strassman et al. | 73/2 |
| 3,363,446 | 1/1968 | Kaley | 73/2 |
| 4,185,489 | 1/1980 | Sullivan, Jr. | 73/2 |
| 4,279,395 | 7/1981 | Boggio et al. | 246/182 |
| 4,495,578 | 1/1985 | Sibley et al. | 364/426 |

Primary Examiner—Robert Raevis
Attorney, Agent, or Firm—John F. Ohlandt; Lee Waguespack

[57] ABSTRACT

A speedometer system for automatically calibrating a speedometer by adjusting the speedometer drive to take into account the varying wheel sizes of a locomotive which comprises: at least one speed probe; a speedometer drive; a speedometer; a gate for enabling and disabling the normal speed signal from the speed probe; a programmable counter for transmitting a test speed signal to the speedometer drive to produce a test speed current; a gate for enabling and disabling the transmission of the test speed signal to the speedometer drive; and a microprocessor which is capable of processing a signal representative of wheel size, calculating a test signal frequency, causing the counter to create and transmit the test signal, measuring the speedometer current, and signaling a digital potentiometer to increase or decrease the resistance on the speedometer drive until a full scale current value is measured.

11 Claims, 3 Drawing Sheets

APPARATUS AND PROCESS FOR AUTOMATICALLY CALIBRATING LOCOMOTIVE SPEEDOMETERS AS WHEEL SIZE VARIES

The present invention relates to an apparatus and process for automatically calibrating speedometers, especially those included in railroad cab signal systems; and more particularly, for performing such calibration in accordance with wheel wear compensation switch settings. This automatic calibration of the speedometer eliminates all manual adjustment and removes the possibility of having a discrepancy between the speed used in internal calculations of the Automatic Train Protection (ATP) System and that displayed to the operator.

BACKGROUND OF THE INVENTION

As the wheels on a locomotive wear down due to friction between the wheels and the railroad track, it is necessary to repeatedly calibrate the speedometer so that an accurate reading can be furnished to the operator or engineer. Additionally, in conventional cab signal systems there always exists the problem of calibrating the speedometer to the other elements of the cab signal system. That is to say, no discrepancy should appear between the two. Since many applications of cab signal systems incorporate wheel wear compensation, the calibration of the speedometer must be repeated every time the wheels are re-sized. A conventional method of performing this calibration is to manually adjust a potentiometer located inside the speedometer in accordance with a test signal.

The problem associated with the above-noted conventional calibration method is that it requires manual intervention, which is subject to error, and also necessitate the removal of the speedometer unit in order to adjust the potentiometer.

The present invention has overcome the above and other disadvantages by eliminating all manual intervention in the calibration of the speedometer. This not only removes the manpower requirements to re-adjust the speedometer, but also insures that the cab signal system and the speedometer always correspond to the same wheel size.

The present invention provides a speedometer calibration method and means which is vastly superior to another technique conventionally employed; one in which a microprocessor continually reads a speed probe and modifies the output signal to the speedometer drive to compensate for wheel size differences. This conventional technique results in error due to sampling rate and also consumes valuable processing time. In contrast, the present invention removes the processor from any wheel wear compensation tasks after the initial calibration, which is normally only performed on "power-up" of the system.

The present invention also provides many additional advantages which shall become apparent as described below.

SUMMARY OF THE INVENTION

A primary feature of the present invention resides in a system for automatically calibrating a speedometer by electronically adjusting the drive for the speedometer until full scale current value is measured for the particular wheel size present. More specifically, a digital potentiometer is adjusted by control signals from a microprocessor.

Briefly stated, the present system which automatically calibrates a speedometer does so in one embodiment by means of briefly sampling the inputs from a wheel wear switch matrix which is designed to take into account the varying wheel sizes of a locomotive, the system comprising:

at least one speed probe; a speedometer drive; a speedometer; means for enabling and disabling the normal speed signal from the speed probe to the speedometer drive; means for transmitting a test speed signal to the speedometer drive to produce a test speed current; means for enabling and disabling the transmission of the test speed signal to the speedometer drive; and means for calculating and generating a test signal frequency, measuring the test speed current, and adjusting the resistance at the speedometer drive until a full scale current value is measured.

The means for adjusting the speedometer drive is the aforenoted microprocessor and a digital potentiometer. The microprocessor either increases or decreases the resistance on the speedometer drive's multivibrator, thereby altering its duty cycle, by transmitting an appropriate signal to the digital potentiometer.

Another feature or aspect of the present invention is a process for automatically adjusting the speedometer drive of a speedometer system to accommodate varying wheel sizes of a locomotive which comprises the following steps:

initializing the speedometer system, the speedometer system comprising: at least one speed probe, a speedometer drive, a speedometer, a programmable counter, a microprocessor, an analog/digital converter, a digital potentiometer, and a wheel wear compensation switch; reading the wheel size from the wheel wear compensation switch; calculating the frequency for full scale meter deflection; disabling the normal speed signal from the speed probe; enabling a test speed signal from the programmable counter to be transmitted to the speedometer drive, thereby producing a test speed current; reading the test speed current which has been digitized by the analog/digital converter; increasing or decreasing the resistance at the speedometer drive responsive to the digital potentiometer setting in accordance with the value of the digitized test speed current until the full scale deflection current value is measured; terminating the calibration by disabling the test speed signal, and enabling the normal speed signal from the speed probe to be transmitted to the speedometer drive.

Other and further objects, advantages and features of the present invention will be understood by reference to the following specification in conjunction with the annexed drawing, wherein like parts have been given like numbers.

DESCRIPTION OF PREFERRED EMBODIMENTS

The elimination of all manual intervention in the calibration of the speedometer system of a locomotive is accomplished according to the present invention through the use of a microprocessor, and ancillary components, to recalibrate the speedometer, preferably according to the setting of the system's wheel wear compensation switch means or matrix.

Figure 1:
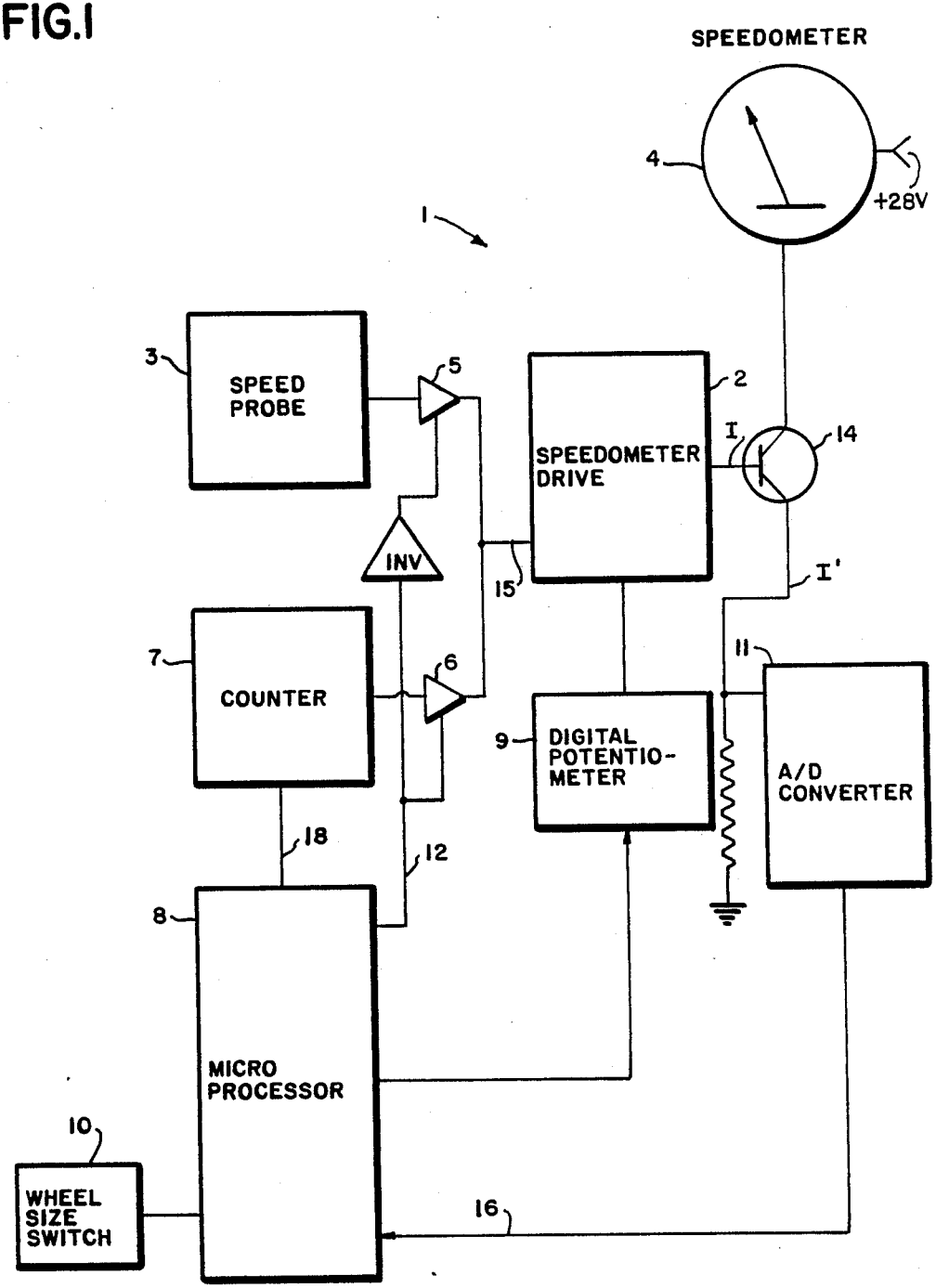
FIG. 1 is a schematic diagram of the speedometer system in accordance with the present invention.

The present invention can best be understood by referring to the attached drawings in which FIG. 1 depicts the basic speedometer system in accordance with the present invention.

Speedometer system 1 is capable of automatically calibrating speedometer 4 by automatically adjusting speedometer drive 2 in accordance with the varying wheel sizes of a locomotive, particularly as the size varies due to wear. Speedometer system 1 comprises: at least one speed probe 3 for measuring wheel speed, for example in revolutions per second, and for providing an electrical signal indicative of such speed measurement; the speedometer drive 2 and speedometer 4; a buffer gate 5 for enabling and disabling the normal speed signal from speed probe 3; a programmable counter 7 which is capable of generating a test speed signal to be fed to the speedometer drive 2, thereby to produce a test speed current at the speedometer 4. Further included is a buffer gate 6 for enabling and disabling the transmission of the test speed signal from programmable counter 7; and a microprocessor 8 which is capable of calculating a test signal frequency, measuring the test speed current, and signaling a digital potentiometer 9 to increase or decrease the resistance on speedometer drive 2 until a full scale current value is measured.

Figure 2:
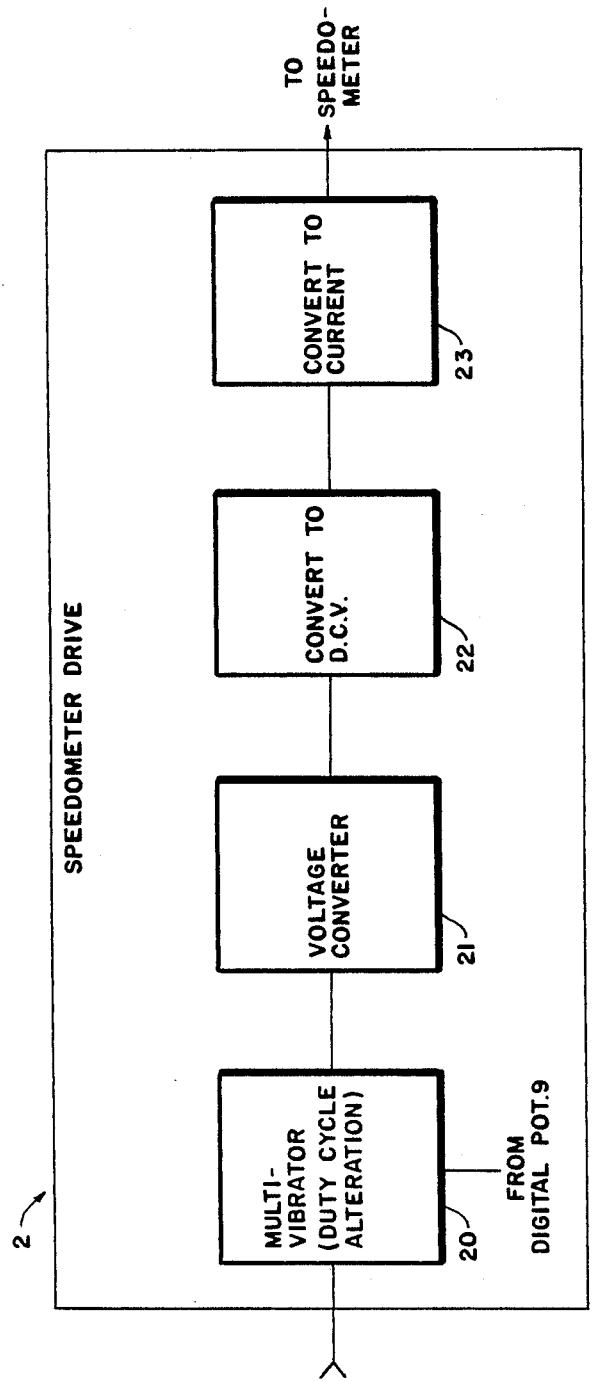
FIG. 2 is a schematic diagram of the speedometer drive circuit in accordance with the present invention.

Referring to FIG. 2, speedometer 4 is driven by speedometer drive 2 which is a frequency to current converter circuit, comprising, as seen first on the left, a retriggerable one-shot multivibrator 20, which functions to convert a square wave generated from the speed probe 3 into a pulse train having the same frequency as the normal speed signal. It is the duty cycle of this pulse train that is proportional to the current used to drive the speedometer.

At the next stage of speedometer drive 2 is a voltage converter 21 used to convert the pulse train of the normal speed signal from +5 VDC to +12 VDC. Connected to the output of the voltage converter is a low pass Butterworth filter 22 for filtering the +12 VDC signal such that its output is a DC voltage which is proportional to the input signal frequency. The final stage of the speedometer drive is a voltage to current converter 23 for converting the DC voltage to a corresponding current level. This current I is used to drive, for example, a 10 milliamp speedometer movement.

In speedometer system 1, microprocessor 8 is capable of altering the current I used to drive speedometer 4 by altering the duty cycle of the signal output from retriggerable one-shot multivibrator 20, shown in FIG. 2, of speedometer drive 2. The duty cycle is altered by varying the resistance in the multivibrator circuit using a digitally programmable potentiometer 9 with electrically erasable memory to retain settings.

Autocalibration of speedometer system 1 is performed as follows:

(a) Microprocessor 8 prevents transmission of the normal speed signal from speed probe 3 by disabling buffer gate 5 and permits transmission of a test speed signal from a programmable sixteen bit counter 7 by enabling buffer gate 6. The inverter Inv enables complementary enabling and disabling of the respective gates by the same logic signal on output line 12 of the microprocessor.

(b) Responsive to a "power up" state, microprocessor 8 takes the wheel size information microprocessor takes, as a given, the maximum reading that the speedometer can provide. The microprocessor 8 determines the probe frequency (Hz/MPH) from the measurement of wheel speed made by speed probe 3 by factoring in the wheel size information. Further, the microprocessor calculates the test frequency. The test frequency is calculated to give given maximum speedometer deflection. For example, the test signal frequency, when the maximum speedometer reading is 80 MPH and the probe frequency for a wheel size of 26 inches is 71 Hz/MPH, is $80 \times 71 = 5680$ Hz. Microprocessor 8 then calculates the divisor required to obtain this frequency from programmable counter 7. The test speed signal is then fed by line or path 15 to speedometer drive 2. The resulting emitter current I' of output transistor 14, which is connected to the output of drive 2, is measured digitally by microprocessor 8 as received from a feedback path 16 including an analog/digital converter 11.

(c) If the current measured is not the full scale deflection current, microprocessor 8 either increases or decreases the resistance of the multivibrator 20, shown in FIG. 2, of speedometer drive 2 until the full scale current value is measured.

(d) Once the full scale current value is measured, the calibration is terminated because microprocessor 8 then disables the test speed signal by disabling buffer gate 6 and enables the normal speed signal from speed probe 3 to be transmitted to speedometer drive 2 by enabling buffer gate 5.

Figure 3:
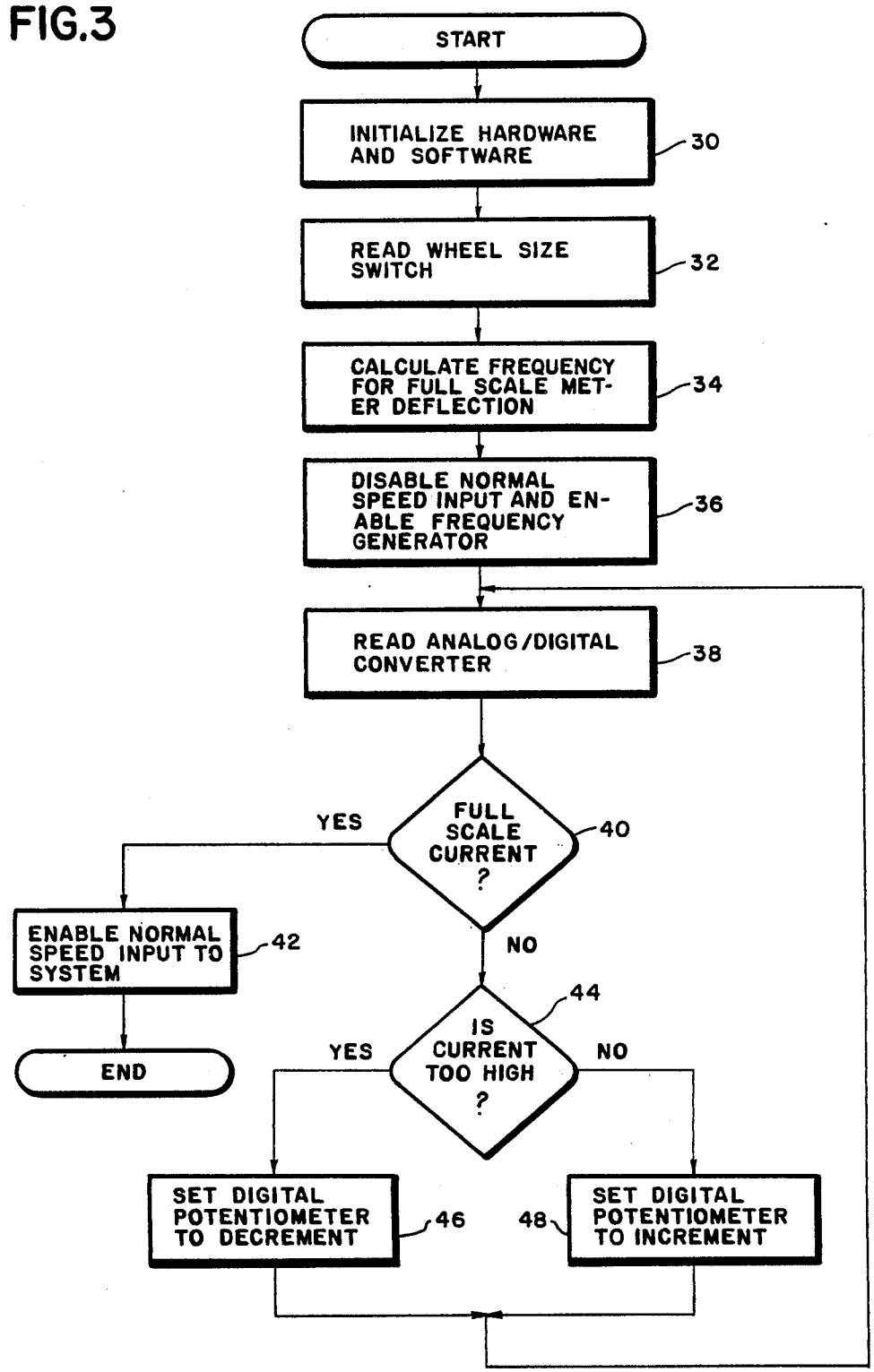
FIG. 3 is a flowchart of the process for automatically adjusting the speedometer drive of a speedometer system in accordance with the present invention.

The process aspect of the present invention will be appreciated by reference to FIG. 3, in which a flowchart sets forth, by means of functional blocks, the complete operational steps for the entire system, including the microprocessor, whereby the locomotive speedometer is automatically calibrated and recalibrated to take into account any variations in wheel size. Thus, after START, the first operational step is to initialize hardware and software—a well understood conventional step—such step being designated 30 in FIG. 3. It is important to note that the next operational step 32 of READ WHEEL SIZE SWITCH preferably takes place in response to "power up" of the microprocessor 8 and is performed automatically each time the power is switched on. It is also important to note that the calibration and recalibration need only occur at these power up instances, although such step could be initiated at another time if required, the important point being that this is not a constant or continual operation.

The step 34 CALCULATE FREQUENCY FOR FULL SCALE METER DEFLECTION has been explained in brief terms already. It should also be noted, however, that a connection 18 is provided from the microprocessor 8 to the counter 7 in order that the newly calculated frequency for the given wheel size can be fed to the counter.

The operational step 36 DISABLE NORMAL SPEED INPUT AND ENABLE FREQUENCY GENERATOR, will be apparent from what has been described already.

The next step in the flowchart of READ ANALOG/DIGITAL CONVERTER is performed as already noted, such being accomplished by means of the feedback line 16 including the A/D converter 11. Notably, however, within the microprocessor 8 the operational step 40, which is a decisional function, takes place; that is, the determination is made therein whether full-scale current has been fed back. If the answer is yes, the calibration is terminated because the further operational step 42 ENABLE NORMAL SPEED INPUT TO SYSTEM is carried out.

However, in the event that the microprocessor 8 determines that there is not full-scale current being fed back, the answer being NO to the question, then the next decisional function, that is, the operational step, IS COUNT TOO HIGH?, is carried out and if the answer is YES, the further operational step is performed, namely step 46 to SET DIGITAL POTENTIOMETER DECREMENT. On the other hand, if the answer is NO in block 44, the digital potentiometer is set to increment. In either event, the operation goes back to the step labelled 38.

It will be understood that the incrementing and decrementing steps are readily achieved with an available digital potentiometer, such as one manufactured by the XICOR Corp.

It will be appreciated that if the current measured is not the full scale deflection current value, then the microprocessor either increases or decreases the resistance on the multivibrator 20 of the speedometer drive 2, and thereby alters the multivibrator duty cycle, by means of setting the digital potentiometer to either increment or decrement. Upon attaining a measured current which is equivalent to the full scale deflection current value, the calibration process is terminated, the microprocessor then disabling the test speed signal by disabling the buffer gate 6 and enabling the normal speed signal from the speed probe by enabling the buffer gate 5. It will thus be understood that, rather than operating continually, only a short time period is consumed by the automatic calibration technique of the present invention—whereby it very efficiently and expeditiously achieves its purpose.

While I have shown and described several embodiments in accordance with my invention, it is to be clearly understood that the same are susceptible to numerous changes apparent to one skilled in the art. Therefore, I do not wish to be limited to the details shown and described but intend to show all changes and modifications which come within the scope of the appended claims.

I claim:

1. A speedometer system for automatically calibrating a speedometer by adjusting the speedometer drive in accordance with the varying wheel sizes of a locomotive which comprises:
   at least one speed probe;
   a speedometer drive coupled to such speed probe;
   a speedometer coupled to said drive;
   means for enabling and disabling the transmission of a normal speed signal from said speed probe to said speedometer drive;
   means for transmitting a test speed signal to said speedometer drive to produce a test speed current;
   means for enabling and disabling the transmission of said test speed signal to said speedometer drive; and
   means for calculating and generating respective test signal frequencies in accordance with wheel size variation, including means for measuring said test speed current and for adjusting said speedometer drive until a full scale current value is measured.

2. The system according to claim 1, in which said means for calculating and generating test signal frequencies includes a microprocessor and a digital potentiometer, and in which both said means for enabling and disabling are controlled by said microprocessor.

3. The system according to claim 2, wherein said means for transmitting said test speed signal to said speedometer drive to produce a test speed current including a programmable counter.

4. The system according to claim 3, wherein said means for enabling and disabling the transmission of said test speed signal to said speedometer drive is a gate disposed between said programmable counter and said speedometer drive, said gate being controlled by said microprocessor.

5. The system according to claim 2, further comprising a wheel size switch, and wherein said microprocessor calculates a test signal frequency by taking (1) the wheel size information from said wheel size switch, (2) the maximum speedometer reading, as a given, and (3) the speed probe frequency; whereby said test signal frequency is calculated to give a maximum speedometer deflection.

6. The system according to claim 2, wherein said test speed current is digitized by an analog/digital converter prior to being measured by said microprocessor.

7. The system according to claim 2, wherein said microprocessor adjusts said speedometer drive by setting said digital potentiometer, said digital potentiometer being programmable and having an electrically erasable memory to retain settings.

8. The system according to claim 2, wherein said speedometer drive includes a speedometer drive circuit comprising:
   a means for converting a square wave generated from said speed probe into a pulse train having the same frequency as said normal speed signal;
   a means for converting said pulse train of said normal speed signal from +5 VDC to +12 VDC;
   a means for filtering said +12 VDC signal such that its output is a DC voltage which is proportional to the frequency of said normal speed signal; and
   a means for converting said DC voltage to a current.

9. The system according to claim 8, wherein said means for converting said square wave is a retriggerable one-shot multivibrator.

10. The system according to claim 9, in which said microprocessor either increases or decreases the resistance on said speedometer drive's multivibrator by transmitting an appropriate setting to said digital potentiometer.

11. A process for automatically calibrating the speedometer drive of a speedometer system to accommodate varying wheel sizes of a locomotive which comprises the following steps:
   initializing said speedometer system, said speedometer system comprising: at least one speed probe, a speedometer drive, a speedometer, a programmable counter, a microprocessor, an analog/digital converter, a digital potentiometer, and a wheel wear compensation switch;
   reading the wheel size from said wheel wear compensation switch;
   calculating the frequency for full scale meter deflection, disabling the normal speed signal from said speed probe, and enabling a test speed signal from said programmable counter to be transmitted to said speedometer drive, thereby producing a test speed current;

sensing said test speed current which has been digitized by said analog/digital converter;

increasing or decreasing the resistance at said speedometer drive, responsive to the digital potentiometer setting, in accordance with the value of said digitized test speed current until the full scale deflection current value is measured;

terminating the calibration by disabling said test speed signal and enabling said normal speed signal from said speed probe to be transmitted to said speedometer drive.

* * * * *